(12) United States Patent
Liu et al.

(10) Patent No.: US 12,022,837 B2
(45) Date of Patent: Jul. 2, 2024

(54) ANIMAL FAT GRADING DEVICE AND METHOD

(71) Applicant: Northeast Agricultural University, Harbin (CN)

(72) Inventors: Qian Liu, Harbin (CN); Baohua Kong, Harbin (CN); Jianchun Han, Harbin (CN); Xiufang Xia, Harbin (CN); Fangda Sun, Harbin (CN); Hongwei Zhang, Harbin (CN); Chuanai Cao, Harbin (CN); Yangyang Feng, Harbin (CN); Fengxue Zhang, Harbin (CN); Sumeng Wei, Harbin (CN)

(73) Assignee: Northeast Agricultural University, Harbin (CN)

( * ) Notice: Subject to any disclaimer, the term of this patent is extended or adjusted under 35 U.S.C. 154(b) by 137 days.

(21) Appl. No.: 17/878,710

(22) Filed: Aug. 1, 2022

(65) Prior Publication Data
US 2023/0200401 A1    Jun. 29, 2023

(30) Foreign Application Priority Data
Dec. 29, 2021  (CN) .......................... 202111633309.0

(51) Int. Cl.
| | |
|---|---|
| *A22B 5/00* | (2006.01) |
| *B01F 27/191* | (2022.01) |
| *B01F 29/81* | (2022.01) |
| *B28C 7/16* | (2006.01) |
| *C11B 1/02* | (2006.01) |
| *C11B 3/16* | (2006.01) |

(52) U.S. Cl.
CPC .......... *A22B 5/0064* (2013.01); *B01F 27/191* (2022.01); *B01F 29/81* (2022.01); *B28C 7/16* (2013.01); *C11B 1/02* (2013.01); *C11B 3/16* (2013.01)

(58) Field of Classification Search
CPC ............ A22B 5/0064; C11B 1/02; C11B 3/16
USPC .......................................... 452/198; 426/231
See application file for complete search history.

(56) References Cited

U.S. PATENT DOCUMENTS 1,469,896 A * 10/1923 Cox .......................... A23D 9/02
165/95
3,742,001 A *  6/1973 Levin ........................ C11B 1/16
554/20

(Continued)

*Primary Examiner* — David J Parsley
(74) *Attorney, Agent, or Firm* — Westbridge IP LLC

(57) ABSTRACT

Disclosed are an animal fat grading device and an animal fat grading method. The device includes a frame, a barrel, a temperature control device, a collecting part, a compacting part and a collecting and stirring assembly; the frame is fixedly connected with the barrel, the barrel is connected with the temperature control device, the collecting part is located at a bottom of the barrel, the compacting part is located inside the barrel, and a top of the frame is telescopically connected with the collecting and stirring assembly; the collecting and stirring assembly includes a connecting plate, a stirring part and a scraper; the top of the connecting plate is telescopically connected with the top of the frame, and the bottom of the connecting plate is fixedly connected with the stirring part and the scraper; the stirring part is located in a center of the scraper, and the scraper corresponds to the compacting part. The application achieves an objective of grading fats with different melting points.

8 Claims, 13 Drawing Sheets

(56) References Cited

U.S. PATENT DOCUMENTS

| | | | | |
|---|---|---|---|---|
| 4,280,961 A * | 7/1981 | Schneider | ............... | C11B 1/104 |
| | | | | 554/20 |
| 4,767,395 A * | 8/1988 | Mellert | ................ | B04B 1/02 |
| | | | | 494/36 |
| 5,176,825 A * | 1/1993 | Hadjis | ................ | E03F 5/14 |
| | | | | 210/507 |
| 5,490,453 A * | 2/1996 | Mackay | ............... | A47J 19/027 |
| | | | | 494/56 |
| 7,306,740 B2 * | 12/2007 | Freund | ............... | B01D 17/0217 |
| | | | | 210/806 |
| 8,071,148 B2 * | 12/2011 | Silvester | ................ | B04B 3/00 |
| | | | | 426/478 |
| 8,926,837 B1 * | 1/2015 | Shumate | ............. | A47J 37/1223 |
| | | | | 210/DIG. 8 |
| 2012/0308708 A1 * | 12/2012 | Seibold | ................ | A23D 7/04 |
| | | | | 426/549 |

* cited by examiner

ANIMAL FAT GRADING DEVICE AND METHOD

CROSS-REFERENCE TO RELATED APPLICATIONS

This application claims priority to Chinese Patent Application No. 202111633309.0, filed on Dec. 29, 2021, the contents of which are hereby incorporated by reference.

TECHNICAL FIELD

The application relates to the technical field of fat processing, and in particular to an animal fat grading device and an animal fat grading method.

BACKGROUND

A saturated fatty acid refers to a fatty acid without an unsaturated double bond. The saturated fatty acid is a fatty acid without an unsaturated bond in a carbon chain, and is one of basic components of lipid. Common saturated fatty acids include caprylic acid, capric acid, lauric acid, myristic acid, palmitic acid, stearic acid, arachidic acid, etc. These fatty acids are mostly contained in the fats of cattle, sheep, pigs and other animals. An excessive intake of the saturated fatty acids is a main reason for an increase of blood cholesterol, triglyceride and LDL-C, and leads to arterial stenosis, atherosclerosis and increases a risk of coronary heart disease. As contents of the saturated fatty acids in animal fats are different, melting points of fats are different. The higher the contents of the saturated fatty acids, the higher the melting points of the animal fats. Therefore, the animal fats may be graded according to different melting points, so as to distinguish qualities of different fats, and facilitate a further utilization of the fats with different saturated fatty acids. Research contents include flavors, colors and effects of the fats with different melting points on human health. Therefore, an animal fat grading device and a method are urgently needed to solve this problem.

SUMMARY

An objective of the application is to provide an animal fat grading device and an animal fat grading method, so as to solve above problems and achieve the objective of grading fats with different melting points.

In order to achieve the above objective, the application provides following schemes.

The animal fat grading device includes a frame, a barrel, a temperature control device, a collecting part, a compacting part and a collecting and stirring assembly; the frame is fixedly connected with a barrel, the barrel is connected with a temperature control device, the collecting part is located at a bottom of the barrel, the compacting part is located inside the barrel, and a top of the frame is telescopically connected with the collecting and stirring assembly;

the collecting and stirring assembly includes a connecting plate, a stirring part and a scraper; the top of the connecting plate is telescopically connected with the top of the frame, and the bottom of the connecting plate is fixedly connected with the stirring part and the scraper; and the stirring part is located in a center of the scraper, and the scraper corresponds to the compacting part.

Optionally, the stirring part includes a motor, the top of the motor is fixedly connected with the connecting plate, an output shaft of the motor is fixedly connected with one end of a rotating shaft, and the other end of the rotating shaft is fixedly connected with a stirring cage.

Optionally, the stirring cage includes an upper slide plate, a pallet and a plurality of stirring rods; a top surface of the upper slide plate is fixedly connected with the other end of the rotating shaft, the pallet is located below the upper slide plate; two T-shaped chutes are respectively arranged on opposite surfaces of the pallet and the upper slide plate, and the two T-shaped chutes are slidably connected with both ends of each stirring rod; and outer walls of the plurality of stirring rods are clamped with a same fixing ring.

Optionally, the top of the scraper is fixedly connected with one end of each of a plurality of connecting columns, and the other end of each connecting column is fixedly connected with the connecting plate; a middle of the scraper is provided with an opening, a top edge of the scraper is provided with a plurality of ejection ports, the ejection ports are connected with an ejection part in a matching way, the bottom of the scraper is fixedly connected with a conical plate, an outer edge of the conical plate is in contact with the inner wall of the barrel, and the middle inside of the scraper is provided with a groove; the groove is communicated with the ejection ports, and the groove corresponds to the compacting part.

Optionally, the compacting part includes a plurality of pressing plate struts, one end of each pressing plate strut is fixedly connected with the bottom of the barrel, and the other end of each pressing plate strut is fixedly connected with an annular pressing plate; and the annular pressing plate is matched with the groove.

Optionally, the ejection part includes two symmetrically arranged slide rails, the bottoms of the two slide rails are fixedly connected with the top of the scraper, and the two slide rails are jointly connected with a same T-shaped slider in a sliding way; the bottom of the T-shaped slider is fixedly connected with a push plate, which is matched with the ejection ports; side walls of the two slide rails are sleeved with springs, and both ends of each spring are fixedly connected with the T-shaped slider and the scraper respectively.

Optionally, the frame includes a base; the bottom of the base is in contact with a ground, the top of the base is fixedly connected with one end of each of a plurality of first struts, the other end of each of the plurality of first struts is fixedly connected with a support sleeve; the inner wall of the support sleeve is fixedly connected with the outer wall of the barrel, the top surface of the support sleeve is fixedly connected with one end of each of a plurality of second struts, and the other end of each of the plurality of second struts is fixedly connected with a support plate; the middle of the bottom of the support plate is fixedly connected with a cylinder, and a movable end of the cylinder is fixedly connected with the top of the connecting plate.

Optionally, the collecting part includes a water pipe communicated with the bottom of the barrel, and an outlet end of the water pipe is provided with a valve.

Optionally, each stirring rod is of an arc structure, and the two ends of each stirring rod are respectively fixedly connected with slippers, which are slidably connected with the two T-shaped chutes.

An animal fat grading method, based on the animal fat grading device, includes the following steps:

melting: putting solid animal fats into the barrel, and heating the barrel by the temperature control device to completely convert the solid animal fats into liquid animal fats;

stirring: starting the motor to stir after the solid animal fats are completely converted into the liquid animal fats; cooling: cooling the barrel by the temperature control device, and squeezing solidified fats into blocks through a continuous expansion and contraction of the cylinder and a cooperation of the scraper and the compacting part; and collecting: driving the scraper to move above the barrel through the contraction of the cylinder when the fats are no longer solidified, and removing the solid fats through the ejection part.

The application has following technical effects: the temperature control device is used for heating and cooling the barrel. The collecting part is used for collecting the liquid animal fats. The scraper scrapes off the animal fats coagulated on the inner wall of the barrel during a cooling process, and the compacting part and the scraper cooperate to compact the solidified fats into blocks, so as to facilitate a collection of graded fats. The grading method according to the application adopts a cooling solidification collection method, which has a high grading precision. In a conventional heating grading collection, melted fats may carry a part of the fats with a high melting point, resulting in a low purity of the fats with the same melting point. In addition, a conventional melting method usually melts the fats from an outside to the inside, and it is impossible to obtain the fats with the same melting point inside the solid fats. The method according to the application avoids above disadvantages. Since the fats are liquid fats before the grading, a part of the whole fats with the same melting point is collected, thus greatly improving the purity of the fats with the same melting point, and a grading effect is better.

BRIEF DESCRIPTION OF THE DRAWINGS

In order to more clearly explain embodiments of the application or the technical solutions in the prior art, the following briefly introduce drawings that need to be used in the embodiments. Obviously, the drawings in the following description are only some embodiments of the application. For those of ordinary skill in the art, other drawings can be obtained according to these drawings without any creative labor.

DETAILED DESCRIPTION OF THE EMBODIMENTS

Figure 1:
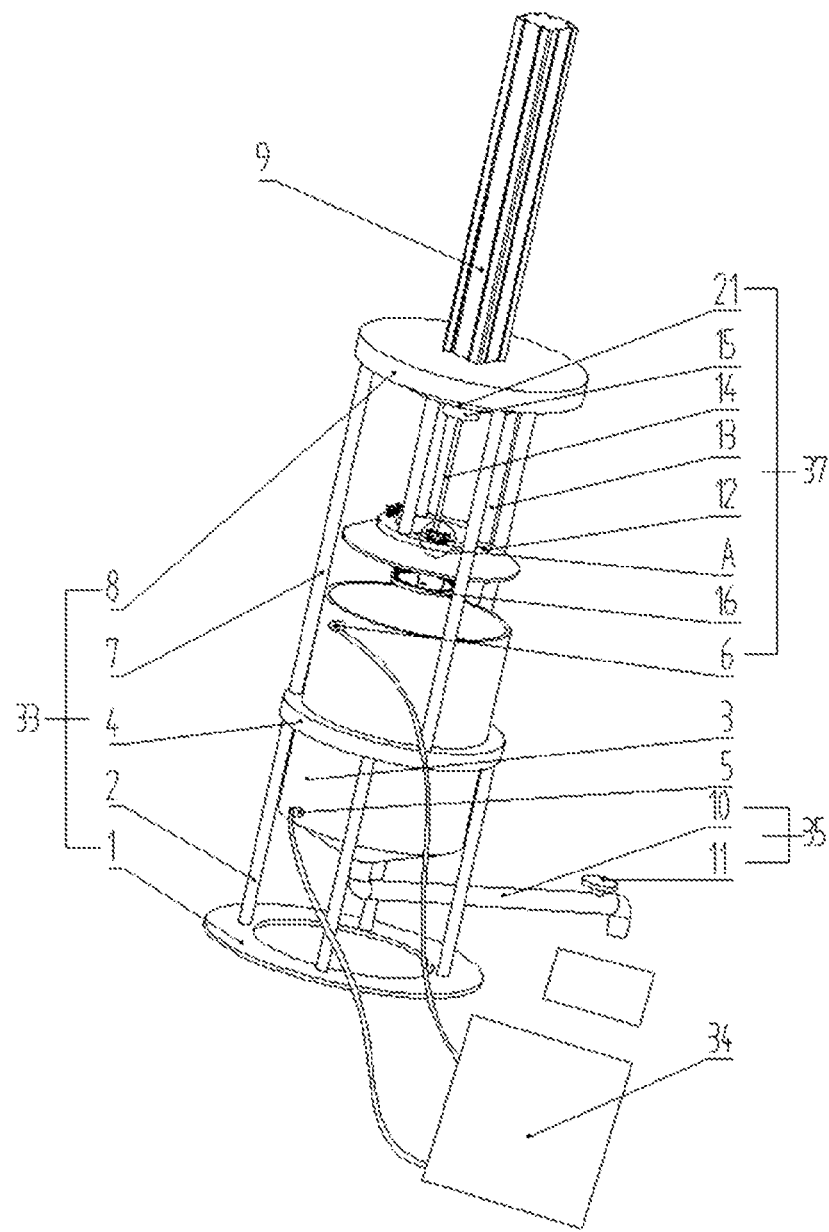
FIG. 1 is a schematic structural diagram according to the application.
Figure 2:
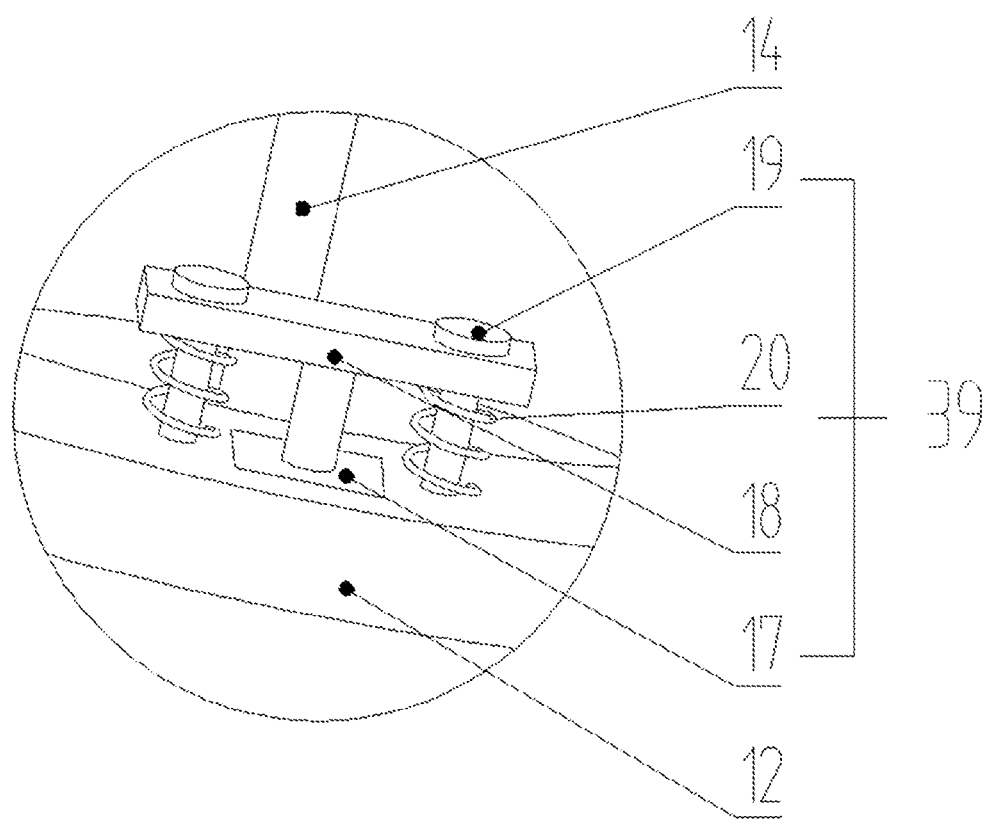
FIG. 2 is a partial enlarged view of A in FIG. 1 according to the application.
Figure 3:
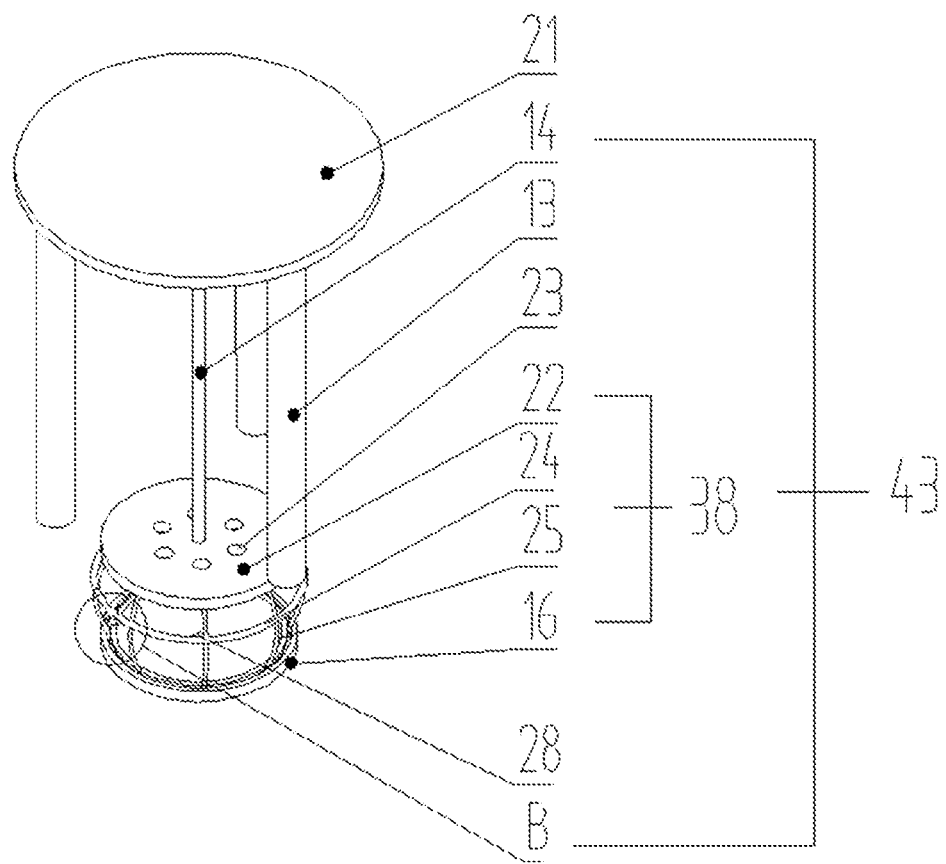
FIG. 3 is a schematic structural diagram of a stirring part according to the application.
Figure 4:
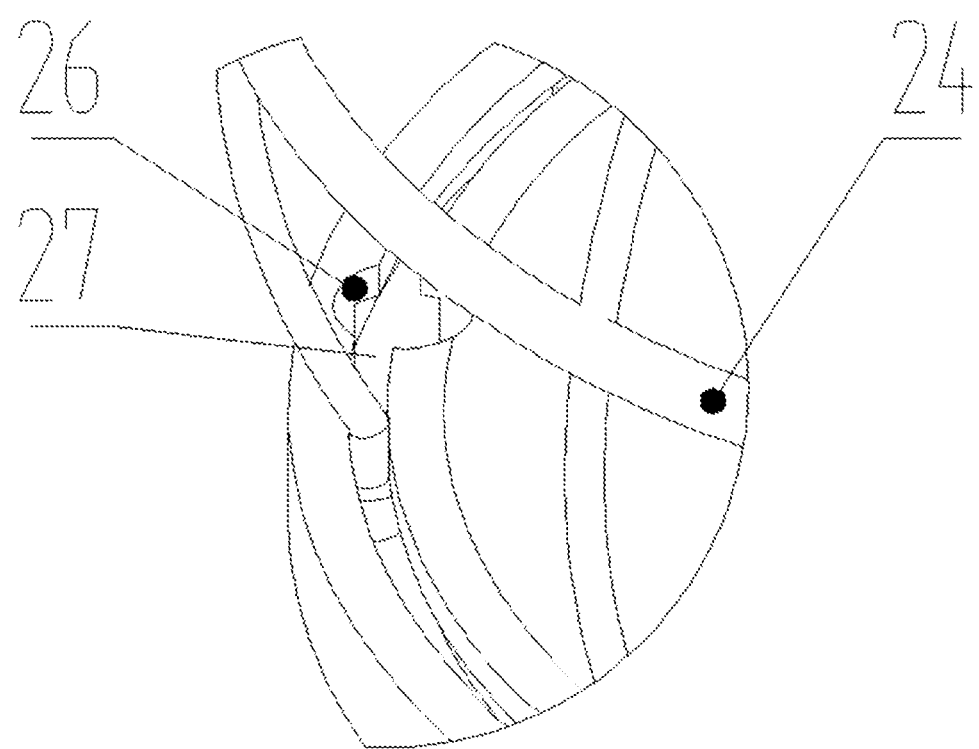
FIG. 4 is a partial enlarged view of B in FIG. 3 according to the application.
Figure 5:
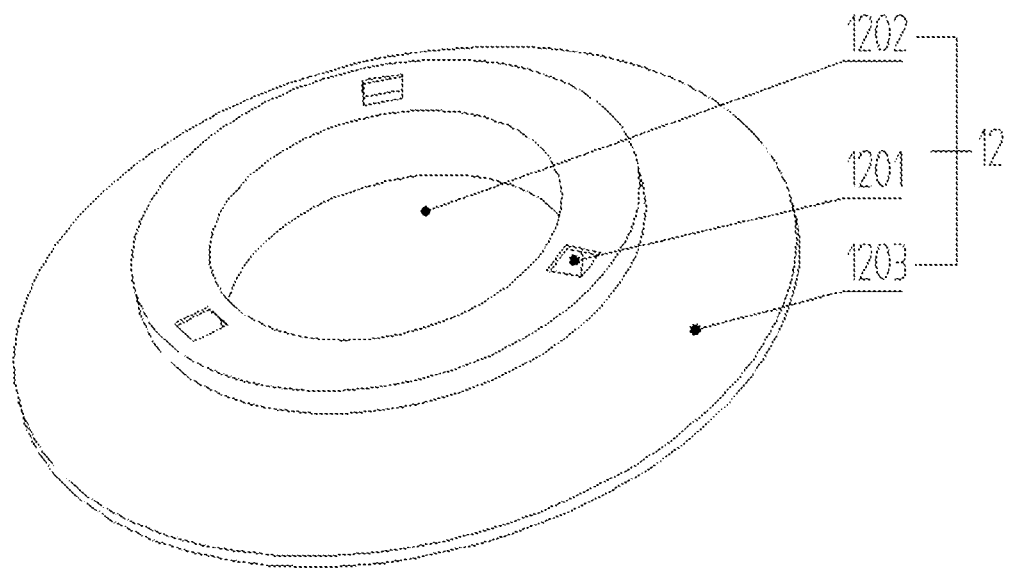
FIG. 5 is a schematic diagram of a scraper structure according to the application.
Figure 6:
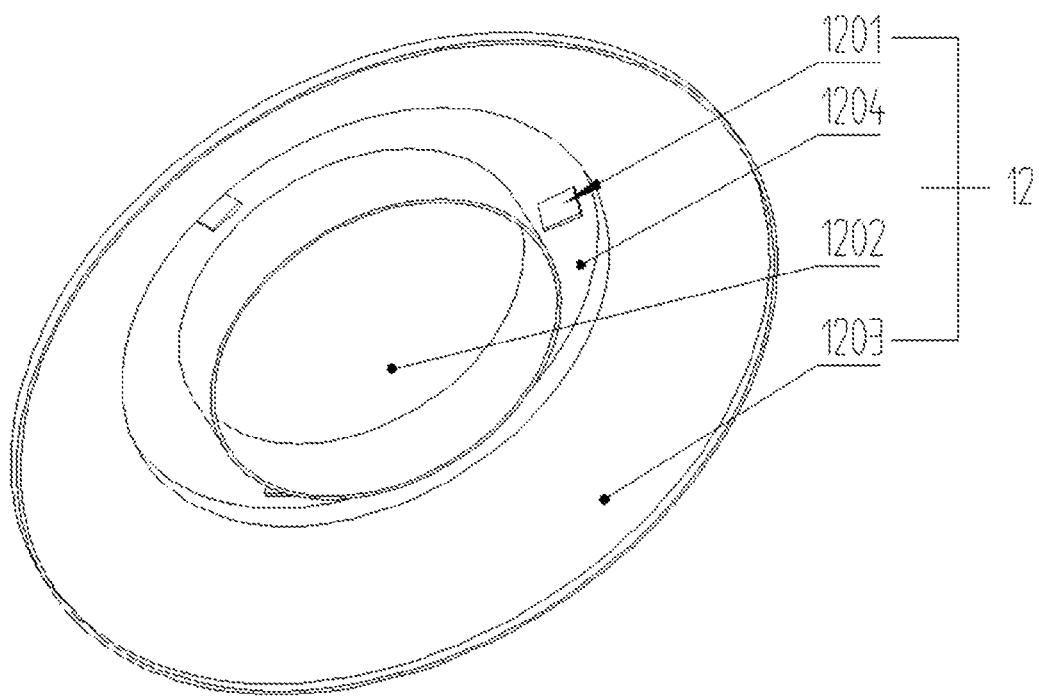
FIG. 6 is a schematic structural diagram of a scraper according to the application from another angle of view.
Figure 7:
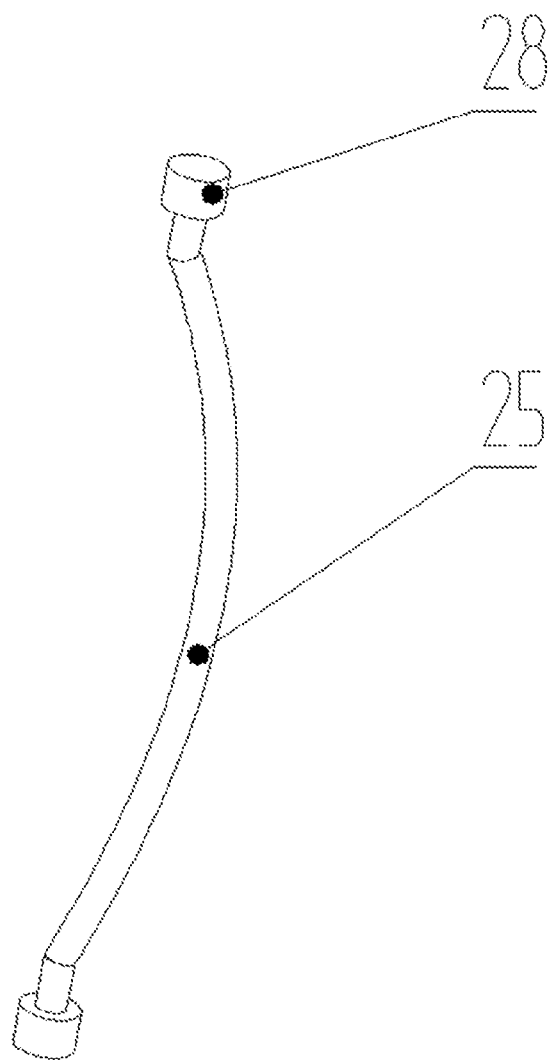
FIG. 7 is a schematic diagram of a structure of a stirring rod according to the application.
Figure 8:
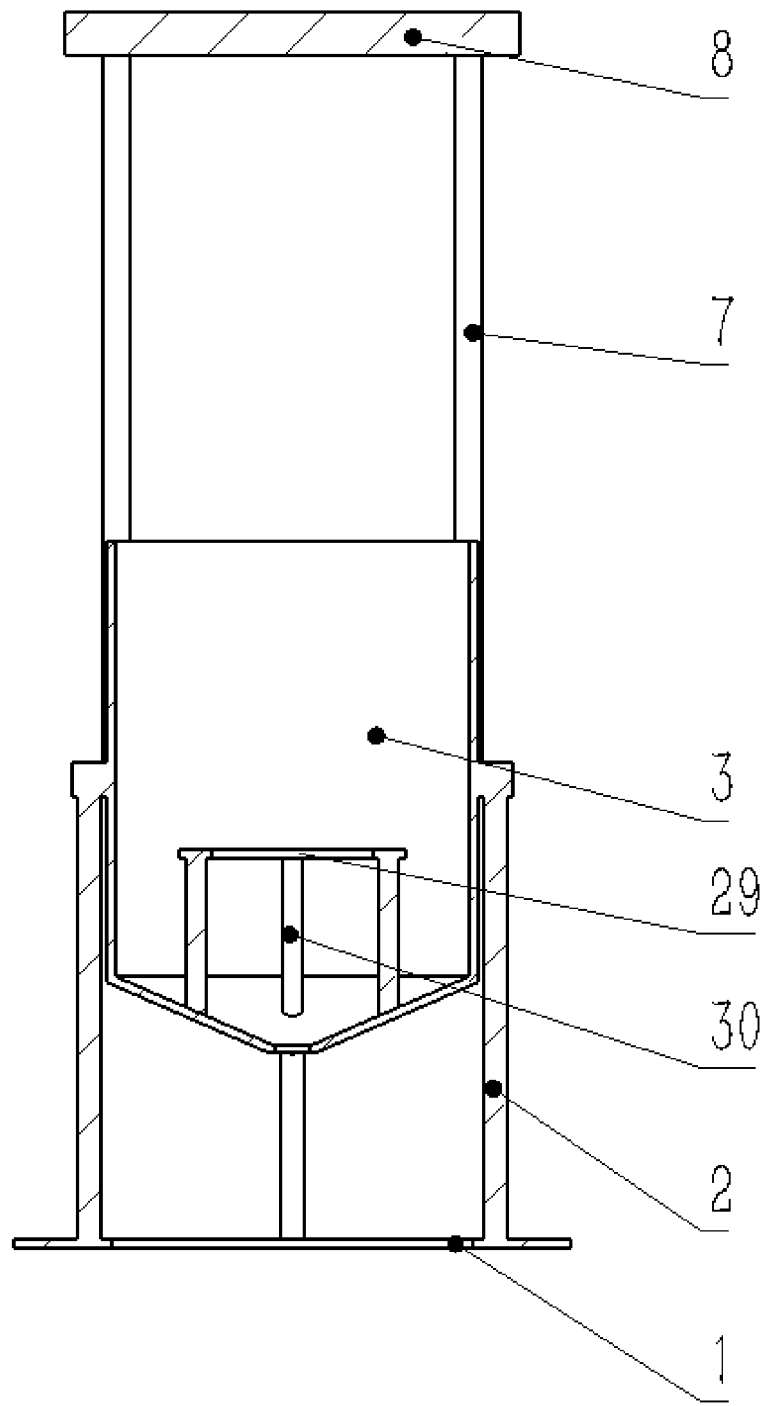
FIG. 8 is a sectional view of a frame according to the application.
Figure 9:
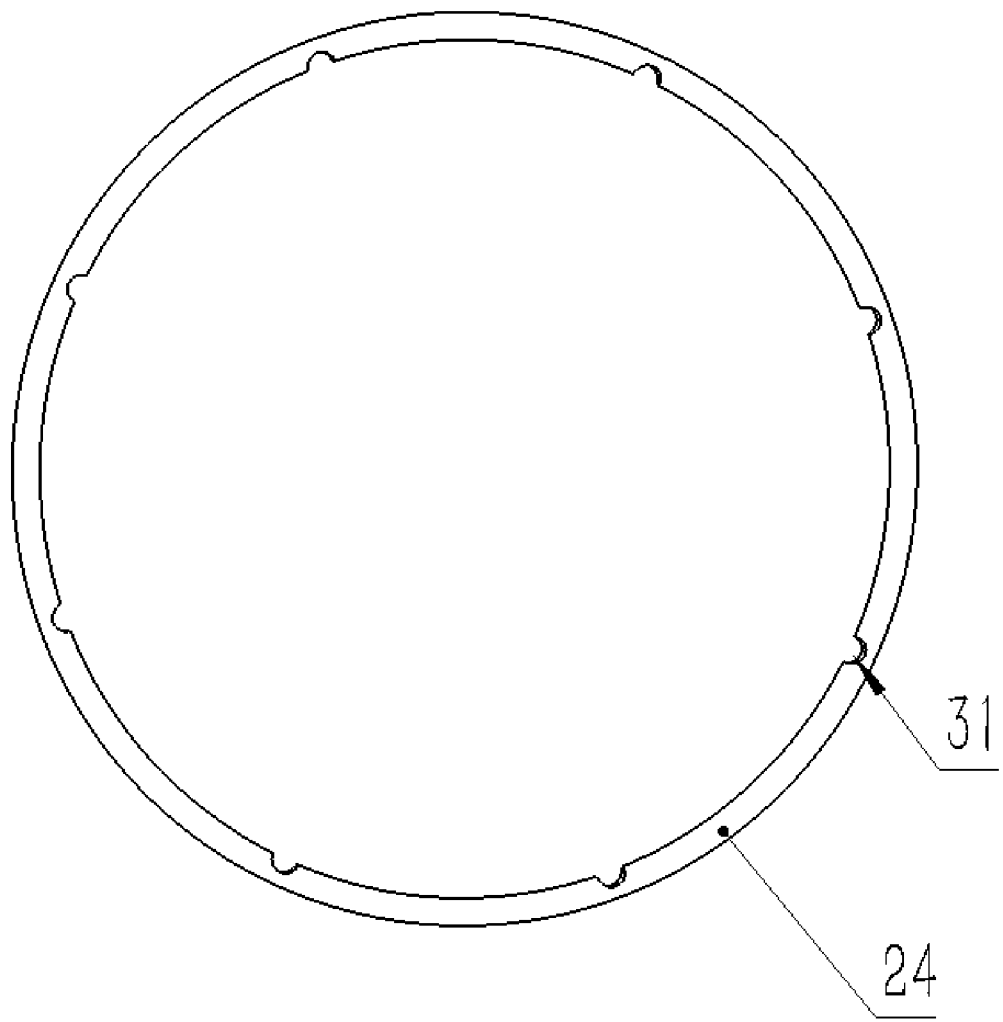
FIG. 9 is a structural schematic diagram of a fixing ring according to the application.

The technical solutions in embodiments of the application are clearly and completely described below with reference to drawings in the embodiments of the application. Obviously, the described embodiments are only part of the embodiments of the application, but not all of them. Based on the embodiment of the application, all other embodiments obtained by ordinary technicians in the field without creative labor are within a scope of the application.

In order to make above objects, features and advantages of the application more obvious and understandable, the application is explained in further detail below with reference to the drawings and detailed description.

Embodiment 1

With reference to FIGS. 1-9, this embodiment provides an animal fat grading device, which includes a frame 33, a barrel 3, a temperature control device 34, a collecting part 35, a compacting part 36 and a collecting and stirring assembly 37; the frame 33 is fixedly connected with a barrel 3, the barrel 3 is connected with a temperature control device 34, the collecting part 35 is located at a bottom of the barrel 3, the compacting part 36 is located inside the barrel 3, and a top of the frame 33 is telescopically connected with the collecting and stirring assembly 37;

the collecting and stirring assembly 37 includes a connecting plate 21, a stirring part 43 and a scraper 12; the top of the connecting plate 21 is telescopically connected with the top of the frame 33, and the bottom of the connecting plate 21 is fixedly connected with the stirring part 43 and the scraper 12; and the stirring part 43 is located in a center of the scraper 12, and the scraper 12 corresponds to the compacting part 36.

A water guide pipe 40 is embedded in a side wall of the barrel 3, one end of the water guide pipe 40 is communicated with a water inlet 5, and the other end of the water guide pipe 40 is communicated with a water outlet 6. The temperature control device 34 may be an intelligent thermostatic circulator ZX-15C, and a temperature control range is −33° C. to 99° C. The temperature control device 34 is communicated with the water inlet 5 and the water outlet 6, and is used for heating and cooling the barrel 3. The collecting part 35 is used for collecting liquid animal fats. The scraper 12 scrapes off the animal fats coagulated on the inner wall of barrel 3 during a cooling process, and the compacting part 36 and the scraper 12 cooperate to compact solidified fats into a block, so as to facilitate a collection of graded fats.

In a further optimization scheme, the stirring part 43 includes a motor 15; the top of the motor 15 is fixedly connected with the connecting plate 21, an output shaft of the motor 15 is fixedly connected with one end of a rotating shaft 14, and the other end of the rotating shaft 14 is fixedly connected with a stirring cage 38. The motor 15 rotates to drive the rotating shaft 14 to rotate, and the rotating shaft 14 drives the stirring cage 38 to rotate; during the cooling process of high-temperature liquid fats, the stirring cage 38 rotates to make the fats mix more evenly and promote a separation of the fats with different melting points. The fat with the higher melting point solidifies first, and facilitates the movement of fine particles coagulated by the fats to the inner wall of the barrel 3 and the collection of solid fats.

In a further optimization scheme, the stirring cage 38 includes an upper slide plate 22, a pallet 16 and a plurality of stirring rods 25; a top surface of the upper slide plate 22 is fixedly connected with the other end of the rotating shaft 14, the pallet 16 is located below the upper slide plate 22; two T-shaped chutes 27 are respectively arranged on opposite surfaces of the pallet 16 and the upper slide plate 22, and the two T-shaped chutes 27 are slidably connected with both ends of each stirring rod 25; and outer walls of the stirring rods 25 are clamped with a same fixing ring 24. The top surface of the upper slide plate 22 is provided with a plurality of through holes 23, which are beneficial to a passage of the liquid fats when the upper slide plate 22 descends; the two T-shaped chutes 27 are provided with mounting ports 26, and the inner walls of the mounting ports 26 are provided with threads; the stirring rods 25 are installed into the two T-shaped chutes 27 through the mounting ports 26; after all the stirring rods 25 are installed, the stirring rods 25 are screwed into the mounting ports 26 by bolts 41, and the inner wall of the same fixing ring 24 is provided with a plurality of clamping grooves 31; the clamping grooves 31 are matched with the outer walls of the stirring rods 25, and the fixing ring 24 fixes the several stirring rods 25. When the rotating shaft 14 drives the upper slide plate 22 to rotate, the bolts 41 act as limits, and the stirring rods 25 stop sliding after contacting with the bolts 41, and then the upper slide plate 22 rotates to stir the liquid fats.

In a further optimization scheme, the top of the scraper 12 is fixedly connected with one end of each of a plurality of connecting columns 13, and the other end of each connecting column 13 is fixedly connected with the connecting plate 21; a middle of the scraper 12 is provided with an opening 1202, a top edge of the scraper 12 is provided with a plurality of ejection ports 1201, the ejection ports are connected with an ejection part 39 in a matching way, the bottom of the scraper 12 is fixedly connected with a conical plate 1203, an outer edge of the conical plate 1203 is in contact with the inner wall of the barrel 3, and the middle inside of the scraper 12 is provided with a groove 1204; the groove 1204 is communicated with the ejection ports 1201, and the groove 1204 corresponds to the compacting part 36. The connecting columns 13 are used to connect the scraper 12 with the connecting plate 21, the opening 1202 is used to pass the liquid fats when the scraper 12 descends, and the ejection part 39 is used to eject the solid fats in blocks, so as to facilitate a removal and the collection of then fats. When the solid fats on the inner wall of the barrel 3 coagulates, the scraper 12 moves downward to scrape off the solid fats, and the solid fats move upward along the inner wall of the conical plate 1203 during a downward movement of the scraper 12, and finally the solid fats move into the groove 1204. The compacting part 36 compacts the accumulated fats in the groove 1204 into blocks. In this cycle, the animal fats are separated from a high melting point to a low melting point. A temperature is set by the temperature control device 34 to realize a fine grading of the fats, and a fineness depends on a precision of the temperature control device 34.

In a further optimization scheme, the compacting part 36 includes a plurality of pressing plate struts 30, one end of each pressing plate strut 30 is fixedly connected with the bottom of the barrel 3, and the other end of each pressing plate strut 30 is fixedly connected with an annular pressing plate 29; and the annular pressing plate 29 is matched with the groove 1204. The pressing plate struts 30 are used to connect the barrel 3 with the annular pressing plate 29, and the annular pressing plate 29 is attached to the groove 1204 to compact the animal fats accumulated in the groove 1204.

In a further optimization scheme, the ejection part 39 includes two symmetrically arranged slide rails 19, the bottoms of the two slide rails 19 are fixedly connected with the top of the scraper 12, and the two slide rails 19 are jointly connected with a same T-shaped slider 18 in a sliding way; the bottom of the T-shaped slider 18 is fixedly connected with a push plate 17, which is matched with the ejection ports 1201; the side walls of the two slide rails 19 are sleeved with springs 20, and both ends of each spring 20 are fixedly connected with the T-shaped slider 18 and the scraper 12 respectively. When the animal fats are no longer coagulated, a part of the fats in blocks has been collected in the groove 1204; the scraper 12 is moved above the barrel 3 and the T-shaped slider 18 is pressed downward; the T-shaped slider 18 drives the push plate 17 to move downward along the ejection ports 1201 to eject the fats in blocks. After release, the T-shaped slider 18 automatically resets under elastic forces of the springs 20. Therefore, an operation is convenient and fast. In a further optimization scheme, the frame 33 includes a base 1; the bottom of the base 1 is in contact with a ground, the top of the base 1 is fixedly connected with one end of each of a plurality of first struts 2, the other end of each of the plurality of first struts 2 is fixedly connected with a support sleeve 4; the inner wall of the support sleeve 4 is fixedly connected with the outer wall of the barrel 3, the top surface of the support sleeve 4 is fixedly connected with one end of each of a plurality of second struts 7, and the other end of each of the plurality of second struts 7 is fixedly connected with a support plate 8; the middle of the bottom of the support plate 8 is fixedly connected with a cylinder 9, and a movable end of the cylinder 9 is fixedly connected with the top of the connecting plate 21.

The base 1 has a ring-shaped structure, which has a high stability after contacting the ground to prevent the whole device from toppling; an expansion and contraction of the cylinder 9 controls upward and downward movements of the scraper 12; the support sleeve 4 is used to connect the base 1 with the barrel 3, and a connection is firm and stable; the second struts 7 are used to connect the support sleeve 4 with the support plate 8; there are preferably three second struts 7 arranged at equal intervals along a central axis of the support sleeve 4; and a distance between adjacent second struts 7 is large, so as to facilitate a taking and placing of the solid fats.

In a further optimization scheme, the collecting part 35 includes a water pipe 10 communicated with the bottom of the barrel 3, and an outlet end of the water pipe 10 is provided with a valve 11. The water pipe 10 is used for an outflow of the liquid fats, and the valve 11 controls an opening and closing of the water pipe 10.

In a further optimization scheme, each stirring rod 25 is of an arc structure, and the two ends of each stirring rod 25 are respectively fixedly connected with slippers 28, which are slidably connected with the two T-shaped chutes 27. The arc structure expands a stirring range, so that the fats with different melting points are distributed more evenly, and the slippers 28 are connected with the T-shaped chutes 27 in a sliding way, so that the slippers 28 are not easy to come out.

An animal fat grading method, based on the animal fat grading device, includes the following steps:

S1, melting: solid lards are put into the barrel 3, and the barrel 3 is heated by the temperature control device 34 at 48° C. to completely convert the solid lards into liquid lards;

S2, stirring: the motor 15 is started after the solid lards are completely converted to the liquid lards; the motor 15 rotates to drive the rotating shaft 14 to rotate, the rotating shaft 14 drives the upper slide plate 22 to rotate, and the upper slide plate 22 drives the plurality of stirring rods 25 to stir in the liquid lards, so that the lards with different melting points are fully mixed;

S3, cooling: the temperature of the barrel 3 is lowered by the temperature control device 34, and the temperature is set at 47.5° C.; the cylinder 9 continuously expands and contracts, so that the groove 1204 and the annular pressing plate 29 are constantly contacted and separated, and a first solidified fat is generated on the inner wall of the barrel 3; the conical plate 1203 scrapes off solidified fats, and the solidified fats are continuously collected in the groove 1204, and the annular pressing plate 29 squeezes these solidified fats into blocks; and S4, collecting: when the fats are no longer solidified, the cylinder 9 contracts to drive the scraper 12 to move above the barrel 3; the solid fats are taken down through the ejection part 39, the T-shaped slider 18 is pressed downwards, and the T-shaped slider 18 drives the push plate 17 to move downwards along the ejection ports 1201 to eject the animal fats in blocks.

This method is used for a fine grading of the animal fats Taking lards as an example, due to different contents of saturated fatty acids in the lards, the melting point of the lards is 28° C.-48° C.

A temperature gradient is set to 0.5° C. and the cooling is continued, the steps of cooling and collecting are repeated; the lards are graded according to the melting points, and a difference of the melting points of the graded lards is 0.5° C., thus completing the grading of the lards, facilitating a follow-up study of flavors, colors and influences on human health of fats with different melting points. The grading method according to this embodiment adopts a cooling solidification collection method, which has a high grading precision. In a conventional heating grading collection, melted fats may carry a part of the fats with the higher melting point, resulting in a low purity of the fats with the same melting point. In addition, a conventional melting method usually melts the fats from outside to inside, and it is impossible to obtain the fats with the same melting point inside the solid fats. The method according to this embodiment avoids above disadvantages. Since the fats are liquid before the grading, a part of the whole fats with the same melting point is collected, thus greatly improving the purity of the fats with the same melting point, and a grading effect is better.

Embodiment 2

Figure 10:
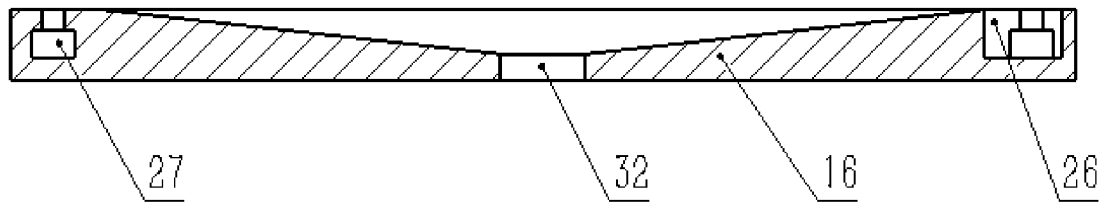
FIG. 10 is a cross-sectional view of a pallet according to the application.
Figure 11:
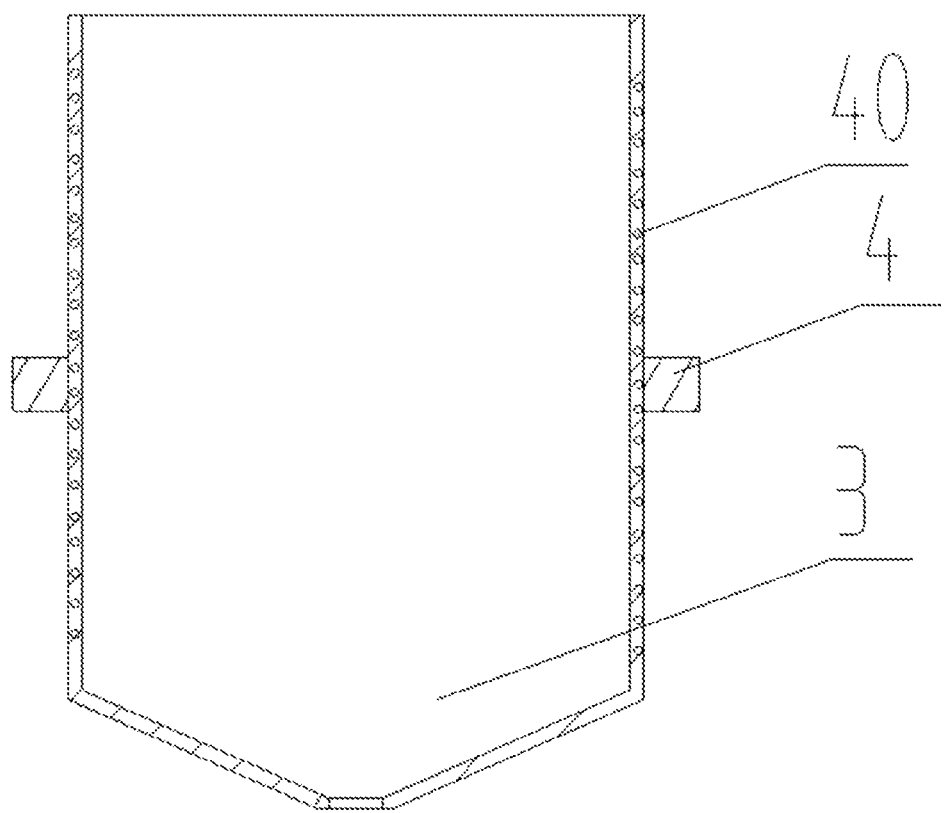
FIG. 11 is a sectional view of a barrel according to the application.
Figure 12:
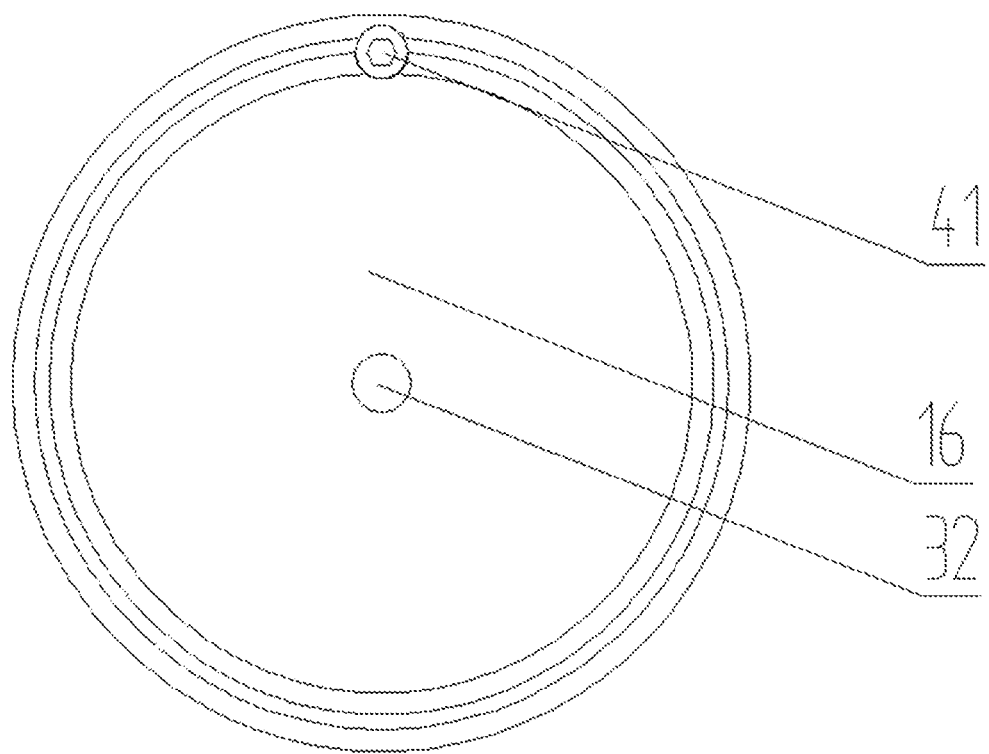
FIG. 12 is a plan view of a pallet according to the application.
Figure 13:
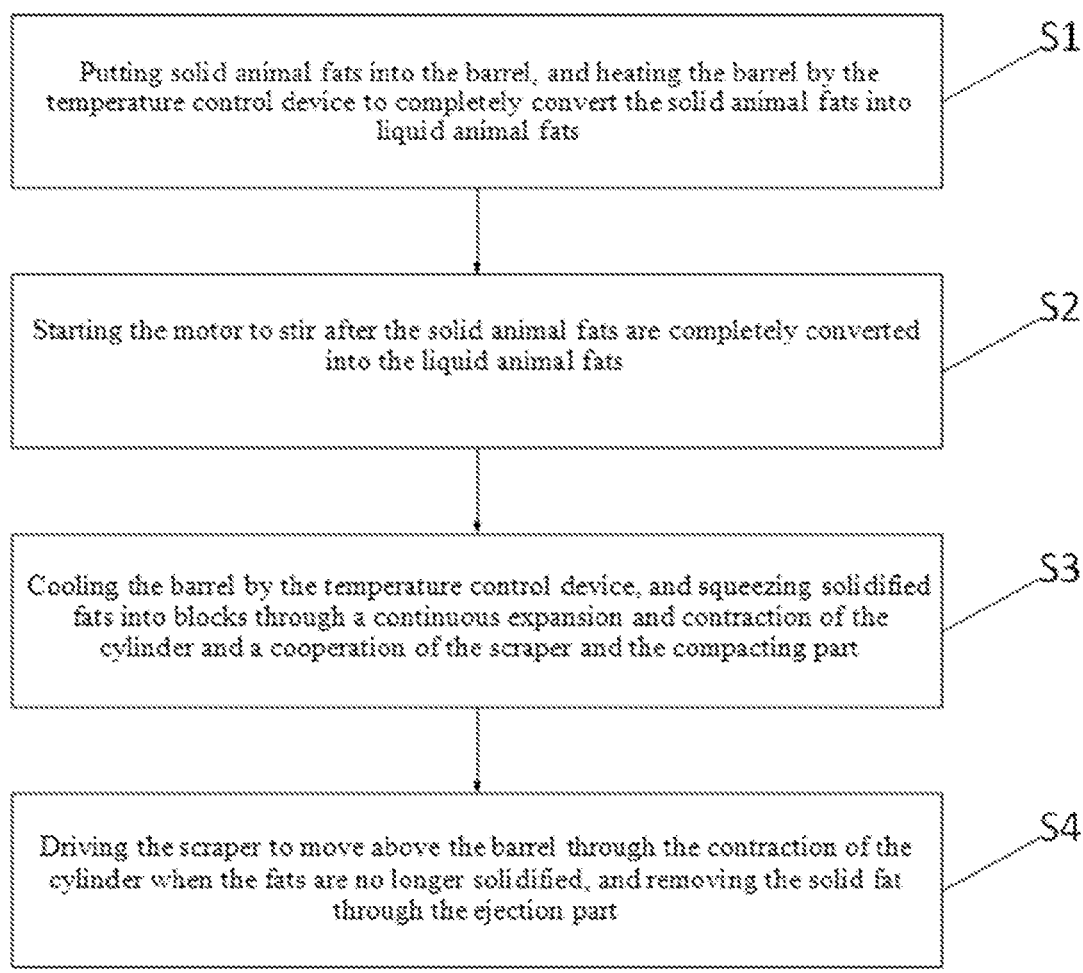
FIG. 13 is a flowchart according to the application.

With reference to FIG. 10, the difference between this embodiment and embodiment 1 is only that the bottom of the pallet 16 has a conical structure, and the bottom of the pallet 16 is provided with an oil outlet 32.

An animal fat grading method applied to the animal fat grading device includes the following steps.

This method is used for a rough grading of the animal fats, with the lards as an example.

Solid animal fats are put on the pallet 16; the fixing ring 24 is removed, and the stirring rods 25 slide to increase the distance between the two adjacent stirring rods 25 until the animal fats in blocks are placed above the pallet 16. After the animal fats in blocks are placed above the pallet 16, the stirring rods 25 are reset, and the fixing ring 24 is installed to lock the stirring rods 25.

Heating and melting: the temperature is set to 28° C. by the temperature control device 34, and the motor 15 is started. The motor 15 rotates to drive the rotating shaft 14 to rotate, and the rotating shaft 14 drives the upper slide plate 22 to rotate, so that the solid lards on the pallet 16 are heated more evenly.

Collecting: the melted lards flow out from the oil outlet 32 to the bottom of the barrel 3. When the valve 11 is opened, the liquid lards flow out from the water pipe 10. The lards are collected, cooled and packaged by a sampling box 42.

The temperature gradient is set to 1° C. and the heating is continued, the steps of heating, melting and collecting are repeated, and the lards are graded. This embodiment adopts a heating melting grading method. The fats with the low melting point are melted by heating, and then collected. By setting the temperature gradient, the fats with different melting points are graded one by one. A grading speed is fast and an efficiency is high.

In the description of the application, it should be understood that an orientation or position relationship indicated by the terms "longitudinal", "transverse", "upper", "lower", "front", "rear", "left", "right", "vertical", "horizontal", "top", "bottom", "inner", "outer" and so on is based on the orientation or position relationship shown in the attached drawings, only for a convenience of describing the application, rather than indicating or implying that the device or element referred to must have a specific orientation, be constructed and operated in a specific orientation, it cannot be understood as a limitation of the application.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection determined by the claims of the application.

What is claimed is:

1. An animal fat grading device, comprising a frame, a barrel, a temperature control device, a collecting part, a compacting part and a collecting and stirring assembly, wherein the frame is fixedly connected with the barrel, the barrel is connected with the temperature control device, the collecting part is located at a bottom of the barrel, the compacting part is located inside the barrel, and a top of the frame is telescopically connected with the collecting and stirring assembly;

the collecting and stirring assembly comprises a connecting plate, a stirring part and a scraper; a top of the connecting plate is telescopically connected with the top of the frame, and a bottom of the connecting plate is fixedly connected with the stirring part and the scraper; and the stirring part is located in a center of the scraper, and the scraper corresponds to the compacting part;

wherein the stirring part comprises a motor, a top of the motor is fixedly connected with the connecting plate, an output shaft of the motor is fixedly connected with one end of a rotating shaft, and the other end of the rotating shaft is fixedly connected with a stirring cage;

wherein the stirring cage comprises an upper slide plate, a pallet and a plurality of stirring rods; a top surface of the upper slide plate is fixedly connected with the other end of the rotating shaft, the pallet is located below the upper slide plate; two T-shaped chutes are respectively arranged on opposite surfaces of the pallet and the upper slide plate, and the two T-shaped chutes are slidably connected with both ends of each stirring rod; and outer walls of the plurality of stirring rods are clamped with a same fixing ring.

2. The animal fat grading device according to claim 1, wherein a top of the scraper is fixedly connected with one end of each of a plurality of connecting columns, and the other end of each connecting column is fixedly connected with the connecting plate; a middle of the scraper is provided with an opening, a top edge of the scraper is provided with a plurality of ejection ports, the ejection ports are connected with an ejection part in a matching way, a bottom of the scraper is fixedly connected with a conical plate, an outer edge of the conical plate is in contact with the inner wall of the barrel, and the middle inside of the scraper is provided with a groove; the groove is communicated with the ejection ports, and the groove corresponds to the compacting part.

3. The animal fat grading device according to claim 2, wherein the compacting part comprises a plurality of pressing plate struts, one end of each pressing plate strut is fixedly connected with the bottom of the barrel, and the other end of each pressing plate strut is fixedly connected with an annular pressing plate; and the annular pressing plate is matched with the groove.

4. The animal fat grading device according to claim 2, wherein the ejection part comprises two symmetrically arranged slide rails, bottoms of the two slide rails are fixedly connected with a top of the scraper, and the two slide rails are jointly connected with a same T-shaped slider in a sliding way; the bottom of the T-shaped slider is fixedly connected with a push plate being matched with the ejection ports; side walls of the two slide rails are sleeved with springs, and both ends of each spring are fixedly connected with the T-shaped slider and the scraper respectively.

5. The animal fat grading device according to claim 1, wherein the frame comprises a base; a bottom of the base is in contact with a ground, the top of the base is fixedly connected with one end of each of a plurality of first struts, the other end of each of the plurality of first struts is fixedly connected with a support sleeve; an inner wall of the support sleeve is fixedly connected with an outer wall of the barrel, a top surface of the support sleeve is fixedly connected with one end of each of a plurality of second struts, and the other end of each of the plurality of second struts is fixedly connected with a support plate; a middle of the bottom of the support plate is fixedly connected with a cylinder, and a movable end of the cylinder is fixedly connected with the top of the connecting plate.

6. The animal fat grading device according to claim 1, wherein the collecting part comprises a water pipe communicated with a bottom of the barrel, and a valve is arranged at an outlet end of the water pipe.

7. The animal fat grading device according to claim 1, wherein each stirring rod is of an arc structure, and the two ends of each stirring rod are respectively fixedly connected with slippers, and the slippers are slidably connected with the two T-shaped chutes.

8. An animal fat grading method, based on the animal fat grading device according to claim 1, comprising the following steps:
S1, putting solid animal fats into the barrel, and heating the barrel by the temperature control device to completely convert the solid animal fats into liquid animal fats;
S2, starting the motor to stir after the solid animal fats are completely converted into the liquid animal fats;
S3, cooling the barrel by the temperature control device, and squeezing solidified fats into blocks through a continuous expansion and contraction of the cylinder and a cooperation of the scraper and the compacting part; and
S4, driving the scraper to move above the barrel through the contraction of the cylinder when the fats are no longer solidified, and removing the solid fat through the ejection part.

* * * * *